(12) United States Patent
Miao (10) Patent No.: US 11,963,101 B2
(45) Date of Patent: Apr. 16, 2024

(54) TRANSMIT DIVERSITY MECHANISM FOR POWER SAVING SIGNAL

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 17/268,509

(22) PCT Filed: Aug. 23, 2019

(86) PCT No.: PCT/US2019/047843
§ 371 (c)(1),
(2) Date: Feb. 15, 2021

(87) PCT Pub. No.: WO2020/046733
PCT Pub. Date: Mar. 5, 2020

(65) Prior Publication Data
US 2021/0321333 A1   Oct. 14, 2021

Related U.S. Application Data

(60) Provisional application No. 62/724,430, filed on Aug. 29, 2018.

(51) Int. Cl.
*H04W 52/02* (2009.01)
*H04W 76/28* (2018.01)

(52) U.S. Cl.
CPC ... *H04W 52/0229* (2013.01); *H04W 52/0235* (2013.01); *H04W 52/0274* (2013.01); *H04W 76/28* (2018.02)

(58) Field of Classification Search
None
See application file for complete search history.

(56) References Cited

U.S. PATENT DOCUMENTS 10,057,815 B2   8/2018   Rico Alvarino et al.
10,477,614 B2   11/2019  Feuersaenger et al.
(Continued)

FOREIGN PATENT DOCUMENTS

CN   102177673 A   9/2011
CN   108200640 A   6/2018
(Continued)

OTHER PUBLICATIONS

International Search Report dated Dec. 5, 2019 for International Application No. PCT/US2019/047843.
(Continued)

*Primary Examiner* — Jutai Kao
(74) *Attorney, Agent, or Firm* — Eschweiler & Potashnik, LLC (57) ABSTRACT

Techniques discussed herein can facilitate transmit diversity for power saving signals (e.g., WUS (Wake Up Signal) or GTS (Go To Sleep signal)). One example embodiment comprises an apparatus configured to be employed in a UE (User Equipment), comprising: a memory interface; and processing circuitry configured to: process a power saving signal associated with a drx-onDuration (Discontinuous Reception On Duration) occasion, wherein the power saving signal is received via a set of RBs (Resource Blocks) comprising a first plurality of RBs associated with a first precoder and a different second set of RBs associated with a different second precoder, wherein the set of RBs are within a configured set of time and frequency resources of the drx-onDuration occasion; and determine, based on the set of RBs, whether the power saving signal is a WUS or a GTS.

20 Claims, 4 Drawing Sheets

(56) References Cited

U.S. PATENT DOCUMENTS

| | | |
|---|---|---|
| 11,032,047 B2 | 6/2021 | Liu et al. |
| 2011/0142144 A1 | 6/2011 | Allpress et al. |
| 2018/0227156 A1 | 8/2018 | Papasakellariou |
| 2019/0103941 A1* | 4/2019 | Seo ................. H04L 1/0046 |
| 2020/0037396 A1* | 1/2020 | Islam .................. H04W 88/06 |
| 2020/0119869 A1* | 4/2020 | Taherzadeh Boroujeni ................. H04B 7/0695 |
| 2020/0196242 A1* | 6/2020 | Höglund ................. H04W 8/08 |
| 2020/0221416 A1* | 7/2020 | Wong .................. H04W 56/001 |

FOREIGN PATENT DOCUMENTS

| | | |
|---|---|---|
| CN | 111165027 A | 5/2020 |
| EP | 3151497 A1 | 4/2017 |
| WO | 2019067266 A1 | 4/2019 |

OTHER PUBLICATIONS

"Power Saving Signal for efeMTC." Source: Intel Corporation. Agenda Item: 6.2.5.3. 3GPP TSG RAN WG1 Meeting #92, Athens, Greece, Feb. 26-Mar. 2, 2018. R1-1802373.

"Remaining issues on WUS for MTC." Source: Qualcomm Incorporated. Agenda Item: 6.2.6.3. 3GPP TSG RAN WG1 Meeting #93, Busan, Korea, May 21-25, 2018. R1-1807104.

"General consideration on UE power saving in Rel-16." Source: Huawei, HiSilicon. Agenda Item: 7.2.8. 3GPP TSG RAN WG1 Meeting #94, Gothenburg, Sweden, Aug. 20-24, 2018. R1-1809333.

International Preliminary Report on Patentability dated Mar. 2, 2021 for International Application No. PCT/US2019/047843.

"Extended European Search Report for European Patent Application No. 19854755.6", dated Mar. 14, 2022, 7 Pages.

Guo Ye-cai et al. "Spatial Diversity Decision Feedback Blind Equalization Algorithm with Digital Phase-Locked Loop Structure." Journal of Anhui Univeristy of Science and Technology (Natural Science). Published Dec. 2008.

"WUS evaluations for efeMTC." Source: Sony. Agenda Item: 6.2.5.3. 3GPP TSG-RAN WG1 Meeting #91, Reno, USA, Nov. 27-Dec. 1 20017, R1-1720467.

"Reduced system acquistion time for MTC" Source: Ericsson. Agenda Item: 6.2.5.1. 3GPP TSG-RAN WG1 Meeting #92, Athens, Greece, Feb. 26-Mar. 2, 2018. R1-1801481.

* cited by examiner

TRANSMIT DIVERSITY MECHANISM FOR POWER SAVING SIGNAL

REFERENCE TO RELATED APPLICATIONS

This application is a National Phase entry application of International Patent Application No. PCT/US2019/047843 filed Aug. 23, 2019, which claims priority to U.S. Provisional Application No. 62/724,430 filed on Aug. 29, 2018, entitled "TRANSMIT DIVERSITY MECHANISMS FOR POWER SAVING SIGNAL" and is hereby incorporated by reference in their entirety.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

DETAILED DESCRIPTION

Embodiments described herein can be implemented into a system using any suitably configured hardware and/or software. In various aspects, embodiments discussed herein can facilitate transmit diversity in connection with power saving signals.

Figure 1:
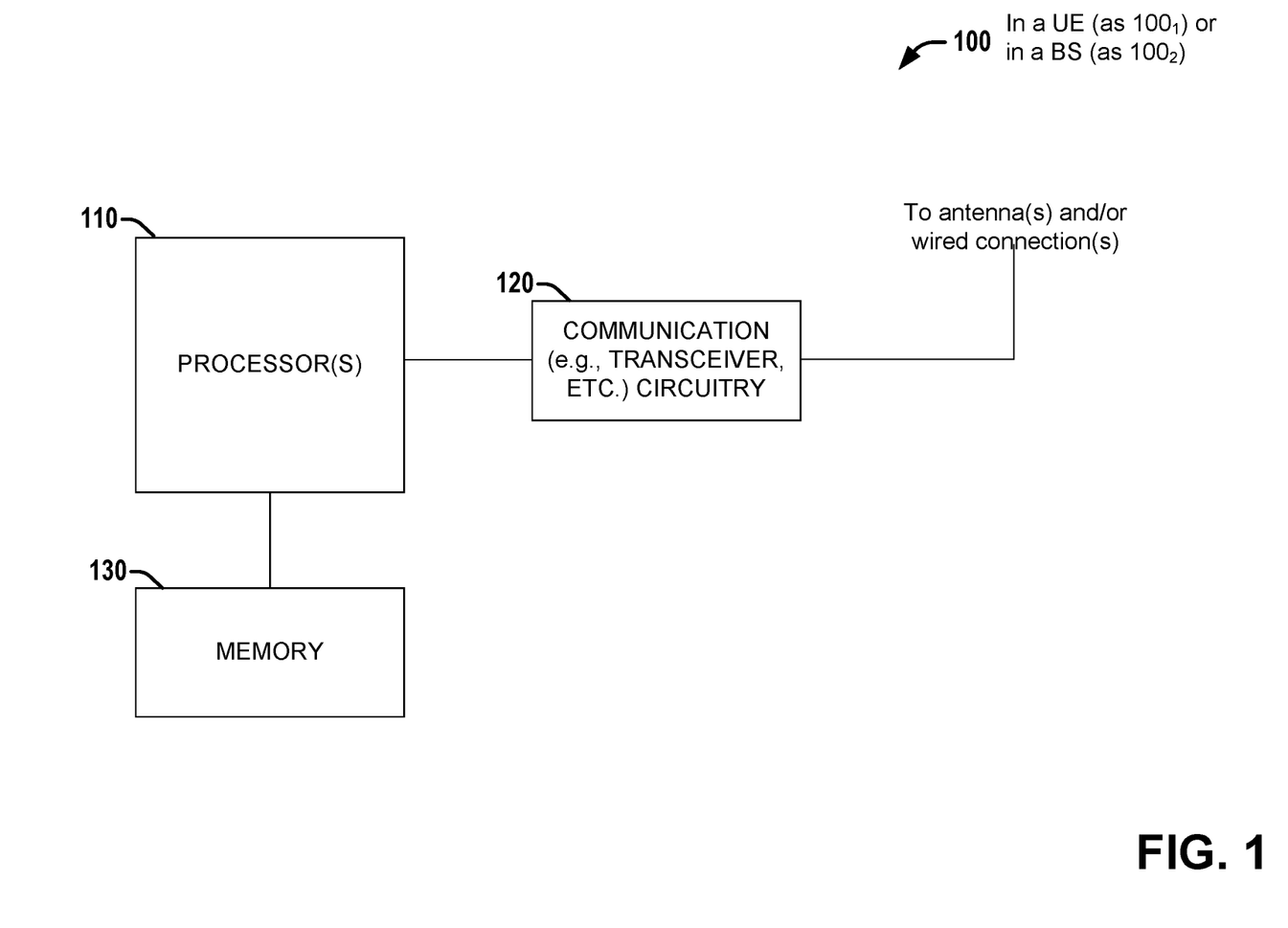
FIG. 1 is a block diagram illustrating a system employable at a UE (User Equipment) or BS (Base Station) that facilitates communication of power saving signals with transmit diversity, according to various aspects described herein.

Referring to FIG. 1, illustrated is a block diagram of a system 100 employable at a UE (User Equipment) (e.g., as system 1001) or a BS (Base Station) (e.g., as system 1002) that facilitates communication of power saving signals with transmit diversity, in embodiments. System 100 can include processor(s) 110 comprising processing circuitry and associated interface(s) (e.g., a communication interface for communicating with communication circuitry 120, a memory interface for communicating with memory 130, etc.), communication circuitry 120 (e.g., comprising circuitry for wired and/or wireless connection(s), e.g., transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof), and a memory 130 (which can comprise any of a variety of storage mediums and can store instructions and/or data associated with one or more of processor(s) 110 or transceiver circuitry 120). In various aspects, system 100 can be included within a user equipment (UE). In BS aspects, system 1002 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network, wherein processor(s) 1102, communication circuitry 1202, and memory 1302 can be in a single device or can be included in different devices, such as part of a distributed architecture. In embodiments, signaling from a UE to a BS can be generated by processor(s) 1101, transmitted by communication circuitry 1201, received by communication circuitry 1202, and processed by processor(s) 1102, while signaling from a BS to a UE (e.g., including configuration of a UE) can be generated by processor(s) 1102, transmitted by communication circuitry 1202, received by communication circuitry 1201, and processed by processor(s) 1101.

UE battery life is an important aspect of the user's experience, which will influence the adoption of 5G (Fifth Generation) handsets and/or services. Thus, ensuring that UE power efficiency for 5G NR (New Radio) UEs is no worse than for LTE (Long Term Evolution) is a target. Device energy efficiency can relate to support for the following two aspects: a) Efficient data transmission in a loaded case; b) Low energy consumption when there is no data. Efficient data transmission in a loaded case is demonstrated by the average spectral efficiency. Low energy consumption when there is no data can be estimated by the sleep ratio.

In new radio (NR), user data is expected to be bursty and served in very short durations. One efficient UE power saving mechanism is to trigger a UE for network access from a power efficient mode. The UE can stay in the power efficient mode, such as micro sleep or OFF period in the long DRX cycle, unless it is informed of network access through a UE power saving framework. Alternatively, the network can assist the UE to switch from "network access" mode to "power efficient" mode when there is no traffic to deliver, e.g., dynamic UE transition to sleep with network assistance signal.

Since more than half of the power consumption in LTE is UE in the access mode, it is important to reduce power consumption during the network access in RRC_CONNECTED mode, which includes the processing of aggregated bandwidth, active RF chain number and active reception/transmission time, and dynamic transition to power efficient mode. Since in the majority of scenarios LTE field TTIs (Transmission Time Intervals) have no data or little data, the power saving scheme for the dynamic adaptation to the different data arrival, traffic in different dimensions, such as carrier, antenna, beamforming, and bandwidth can be considered in RRC_CONNECTED mode for reducing power consumption. Specifically, methods to enhance transitions between "network access" mode and power saving mode can be studied.

Moreover, ensuring reliable reception of the network assisted power saving signal at a UE can also reduce power consumption. This is due to the fact that any erroneous reception event on the power saving signal would have negative impact on UE power consumption and/or other communication performance metrics such as communication latency.

To enhance reception reliability as well as the overall spectral efficiency of power saving signal transmission(s), in various embodiments, one or more techniques discussed herein can be employed to support transmit diversity for network assisted power saving signals (e.g., which can include wake-up signal (WUS) to indicate to a UE to switch from a UE power efficient/saving mode (PSM) to a network access mode (NAM), and a go-to-sleep (GTS) signal to indicate to the UE to remain in the PSM.

Various embodiments discussed herein can employ transmit diversity techniques discussed herein for transmission and/or reception of power saving signal(s) (e.g., WUS, GTS), and resulting spectral efficiency. Specifically, RB (Resource Block)-bundle based precoder cycling can be employed in various embodiments to achieve transmit diversity. Two different sets of techniques can be employed by embodiments.

A first set of embodiments can employ techniques related to RB-bundle configuration based precoder cycling. Various such embodiments can employ techniques comprising one or more of the following: (a) Resource block bundle can be configured and the same precoder can be applied to the resources within the resource block bundle; (b) Precoder cycling can be performed across different resource block bundles; (c) Resource block bundle(s) can be configured with time-first or frequency-first RB numbering schemes; (d) the UE can perform coherent combining within the RB-bundle, and non-coherent combining across different RB bundles; (e) Given a configured RB bundle size, power saving signals with different coverage levels can achieve different transmit diversity orders; etc.

A first set of embodiments can employ techniques related to transmit diversity order configuration based precoder cycling. Various such embodiments can employ techniques comprising one or more of the following: (a) The transmit diversity order can be configured for the power saving signals; (b) RB bundle(s) in power saving signal candidate(s) can be constructed to achieve a configured transmit diversity order; (c) RB bundle(s) can be configured with time-first or frequency-first RB numbering schemes; (d) All power saving candidates independent of targeted coverage level can achieve the same configured transmit diversity order.

Techniques employed in various embodiments can enable transmit diversity for power saving signals. These techniques can significantly enhance the coverage of the power saving signal and consequent overall system spectrum efficiency. Given a SNR operation point, the reduced misdetection rate and false alarm rate can further optimize the transmission latency and UE power consumption, respectively.

Figure 2:
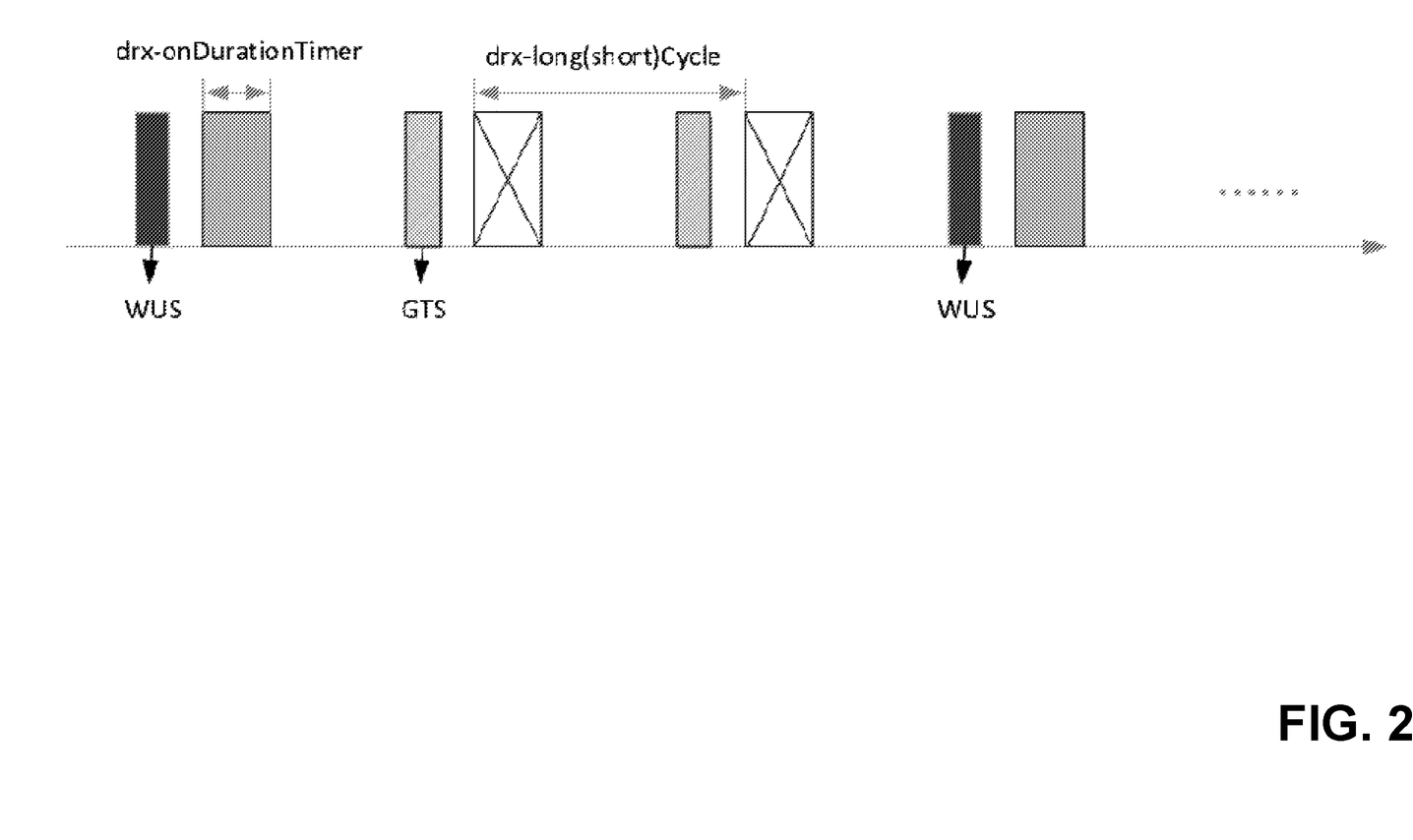
FIG. 2 is a diagram illustrating example power saving signals in WUS (Wake Up Signal)/GTS (Go To Sleep signal) assisted C-DRX (RRC (Radio Resource Control)-Connected mode DRX (Discontinuous Reception)), according to various aspects discussed herein.

Referring to FIG. 2, illustrated is a diagram showing example power saving signals in WUS (Wake Up Signal)/GTS (Go To Sleep signal) assisted C-DRX (RRC (Radio Resource Control)-Connected mode DRX (Discontinuous Reception)), according to various aspects discussed herein. The basic principle of WUS/GTS assisted C-DRX (RRC-Connected mode DRX) is illustrated in FIG. 2. Specifically, a UE can be configured with WUS/GTS signal which is associated with each drx-onDuration occasion. If the WUS is detected by the UE, the UE can enter the "network access mode" (NAM), wherein the MAC entity switches to "Active Time", during the associated drx-onDuration period in which the PDCCH (Physical Downlink Control Channel) monitoring is carried out. Otherwise, if GTS is detected by the UE, the UE can remain in power efficient/saving mode, with the MAC entity in "non-active time" during the associated drx-onDuration occasion so that no PDCCH monitoring is performed.

Transmit Diversity for Power Saving Signal

The power saving signals (WUS or GTS) can be transmitted in confined time-frequency (TF) resources based on configuration. Additionally, to support link adaptation, several WUS/GTS candidates using different amounts of TF resources can be configured to a UE, and the UE can try to detect whether any of those candidates is received at each configured monitoring window, and can consequently determine the corresponding operation for the associated DRX on-duration. To enhance reception reliability and resulting coverage of power saving signal(s), one or more transmit diversity techniques discussed herein can be applied. Several transmit diversity techniques are discussed herein.

Resource Block Bundle Configuration Based Precoder Cycling

Figure 3:
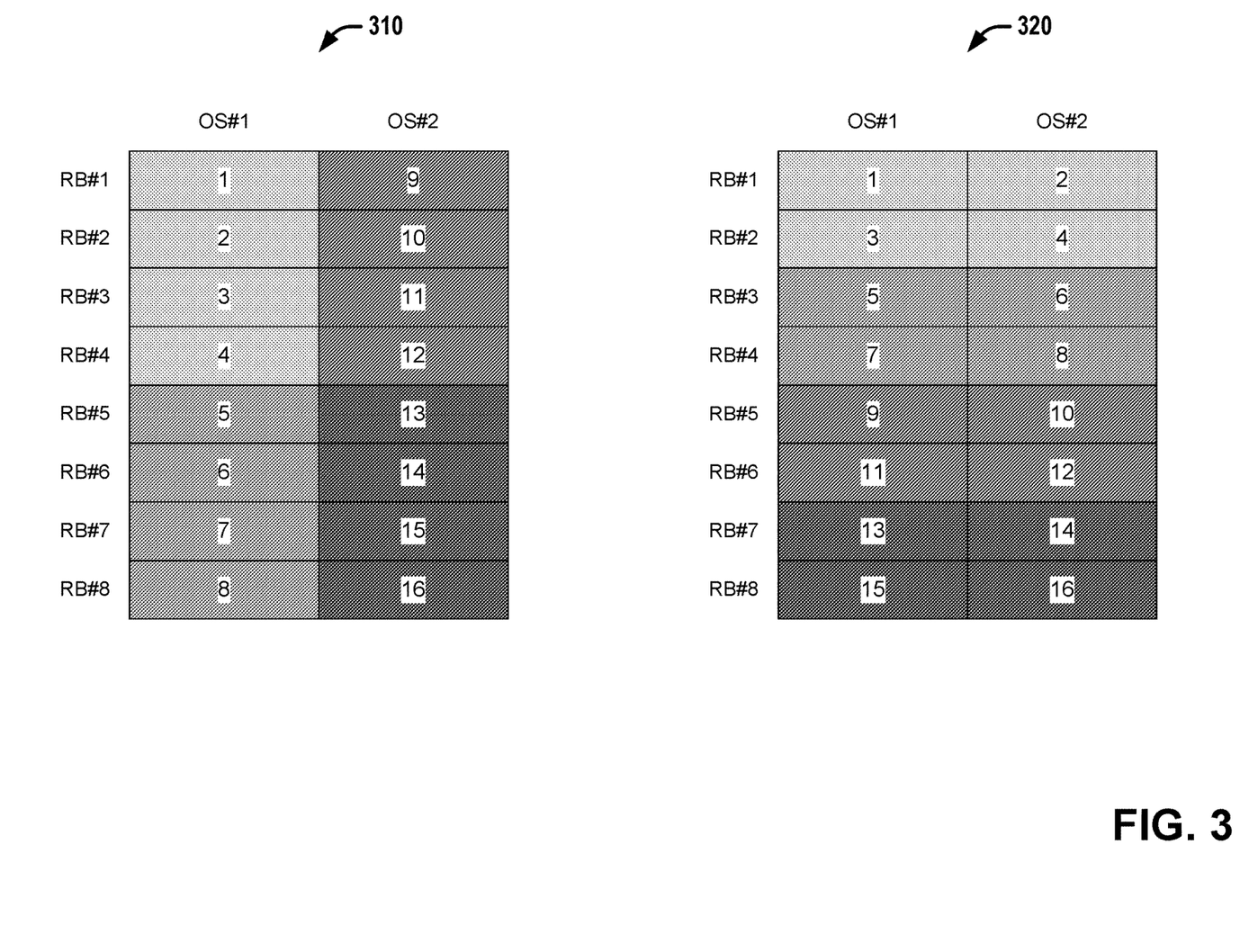
FIG. 3 is a pair of diagrams illustrating examples of RB (Resource Block)-bundle construction that can be employed in embodiments, according to various aspects discussed herein

In a first set of techniques related to RB bundle configuration based precoder cycling, in the TF resource configuration for power saving signal, a parameter (e.g., referred to herein as RB-bundle-size) can be configured (e.g., via RRC) that defines the number of consecutive resource blocks applying the same precoder. Referring to FIG. 3, illustrated is a pair of diagrams showing examples of RB-bundle construction that can be employed in embodiments, according to various aspects discussed herein. For a power saving signal allocated in multiple OFDM (Orthogonal Frequency Division Multiplexing) symbols (e.g., OS #1 or OS #2 in FIG. 3), in some embodiments, as illustrated at example 310, the RB-bundle (e.g., which can comprise RBs having the same shading) can be constructed from RBs consecutively numbered in the order of frequency first, then in the time domain. In other embodiments, as illustrated at example 320, the RB-bundle (e.g., which can comprise RBs having the same shading) can be constructed by RBs consecutively numbered in the order of time first, then in the frequency domain. Additionally, although FIG. 3 shows an example RB-bundle size of four RBs, in various embodiments, a greater or lesser number of RBs can be combined within a RB bundle. Additionally, in some embodiments, the RB bundle size can be configured (e.g., via RRC signaling), while in others it can be fixed in the specification.

In various embodiments, to provide improved flexibility in creating RB-bundle(s) to address possibly different channel scenarios, the numbering scheme of RB-bundles (e.g., either frequency-first or time-first numbering schemes) can be configured by RRC signaling.

Given a particular RB bundling scheme, the UE can determine the resources for a power saving signal over which the coherent combining/correlation can be performed. In various embodiments, coherent combining can be conducted within the RB-bundle, and non-coherent combining can be performed across RB-bundles.

In various aspects, symbol-based precoder cycling (PC), where different precoders can be used for different OFDM symbols, can be employed in embodiments employing frequency-first RB-bundling, and frequency-dependent precoder cycling, where different precoders can be applied for different RB regions with same bandwidth and being located in different frequency part, can be employed in embodiments employing time-first RB-bundling. For example, to achieve symbol-based PC, the RB-bundle can be constructed by using frequency-first RB numbering and the size of the RB-bundle can be configured to be equal to the bandwidth of power saving signal. For frequency-dependent PC, the RB-bundling can be constructed by using time-first RB numbering and the size of the RB-bundle can be set to be x*y, where x equals to the number of OFDM symbols occupied by the power saving signal (e.g., 1, 2, 3, etc., which can be configured via RRC), and y the number of RBs in frequency domain (e.g., which can be configured via RRC) to apply the same precoder.

Transmit Diversity Order Configuration Based Precoder Cycling

When the RB-bundle size is configured via the first set of techniques (e.g., related to RB bundle configuration based precoder cycling), then transmit diversity can be provided by using different precoders for different RB bundles. For power saving candidates containing different amount of allocated RBs to achieve different coverages, then the achieved amount of transmit diversity for power saving candidates with different sizes can be different. Specifically, the power saving signal candidates with smaller target coverage level have smaller transmit diversity than those with larger target coverage levels. To achieve same amount of transmit diversity for all power saving signal candidates, in a second set of techniques, instead of configuring the RB-bundle size as in the first set of techniques, the transmit diversity order can be configured by RRC signaling.

Figure 4:
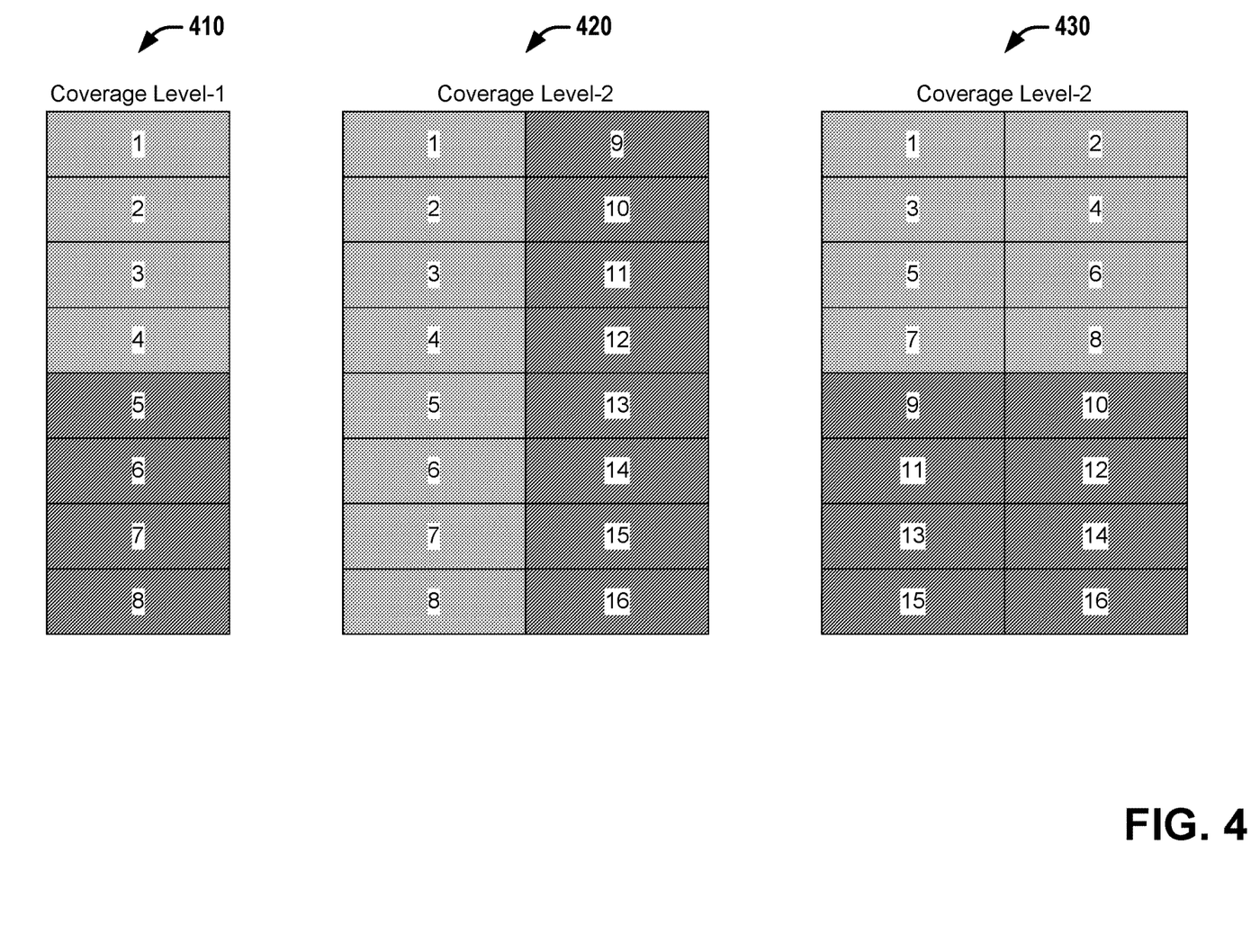
FIG. 4 is three diagrams illustrating examples of configuration based on transmit diversity order that can be employed in embodiments, according to various aspects discussed herein.

Referring to FIG. 4, illustrated is a pair of diagrams showing examples of configuration based on transmit diversity order that can be employed in embodiments, according to various aspects discussed herein. In each of examples 410, 420, and 430, an example transmit order of 2 is employed, although in various embodiments this can be greater or lesser, and can be configured via RRC. Example 410 has coverage level-1, while example 420 has Coverage level-2 employing frequency-first bundling and example 430 has Coverage level-2 employing time-first bundling. In various embodiments, other coverage levels can be employed (e.g., configured via RRC).

FIG. 4 illustrates examples employing the second set of techniques, wherein configured power saving signals can include two coverage level (CL) candidates: a CL-1 candidate of 8 RBs and CL-2 candidates of 16 RBs. In various embodiments, the transmit diversity order (2 in the examples of FIG. 4) as well as the RB bundling direction (e.g., frequency-first as in example 420 or time-first as in example 430) can be configured. Due to the configured transmit diversity order, all the candidates with different CLs can achieve the same transmit diversity. As shown in example 410, the CL-1 candidate has a RB bundle size of 4 RBs and transmit diversity order of 2. The CL-2 candidates shown in examples 420 and 430 have RB bundle size of 8 RBs and the same transmit diversity order of 2 as the CL-1 candidate.

Compared to the first set of techniques, the coverage performance of power saving signals configured by the second set of techniques has a better predictability due to the same order of transmit diversity and linear scaled processing gain from the proportional sequence lengths.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a UE (User Equipment), comprising: a memory interface; and processing circuitry configured to: process a power saving signal associated with a drx-on Duration (Discontinuous Reception On Duration) occasion, wherein the power saving signal is received via a set of RBs (Resource Blocks) comprising a first plurality of RBs associated with a first precoder and a different second set of RBs associated with a different second precoder, wherein the set of RBs are within a configured set of time and frequency resources of the power saving signal; and determine, based on at least one of the set of RBs, a signal waveform of the power saving signal, or signaling content of the power saving signal, whether the power saving signal is a WUS (Wake Up Signal) or a GTS (Go To Sleep signal).

Example 2 comprises the subject matter of any variation of any of example(s) 1, wherein the power saving signal is the WUS, and wherein the processing circuitry is further configured to: cause the UE to enter a NAM (Network Access Mode), wherein a MAC (Media Access Control) entity of the UE is switched to "Active Time" during a drx-onDuration period following the drx-onDuration occasion; and perform monitoring of a PDCCH (Physical Downlink Control Channel) during the drx-onDuration period.

Example 3 comprises the subject matter of any variation of any of example(s) 1, wherein the power saving signal is the GTS, and wherein the processing circuitry is further configured to: cause the UE to remain in a power saving mode, wherein a MAC (Media Access Control) entity of the UE remains in "Non-Active Time" during a drx-onDuration period following the drx-onDuration occasion, wherein the UE does not perform monitoring of a PDCCH (Physical Downlink Control Channel) during the drx-onDuration period.

Example 4 comprises the subject matter of any variation of any of example(s) 1-3, wherein the power saving signal is a power saving signal candidate of a plurality of power saving signal candidates configured to the UE, wherein the processing circuitry being configured to process the power saving signal comprises the processing circuitry being configured to attempt detection of whether one or more power saving signal candidates of the plurality of power saving signal candidates were received during the drx-onDuration occasion.

Example 5 comprises the subject matter of any variation of any of example(s) 1-4, wherein the set of RBs comprises a plurality of RB bundles, wherein each RB bundle of the plurality of RB bundles has a configured RB bundle size, wherein the first plurality of RBs are a first RB bundle of the plurality of RB bundles, and wherein the second plurality of RBs are a second RB bundle of the plurality of RB bundles.

Example 6 comprises the subject matter of any variation of any of example(s) 5, wherein the set of time and frequency resources comprises one or more OFDM (Orthogonal Frequency Division Multiplexing) symbols, and wherein each RB bundle of the plurality of RB bundles comprises y consecutive RBs numbered first in a frequency domain and then in a time domain, wherein y is the configured RB bundle size.

Example 7 comprises the subject matter of any variation of any of example(s) 5, wherein the set of time and frequency resources comprises one or more OFDM (Orthogonal Frequency Division Multiplexing) symbols, and wherein each RB bundle of the plurality of RB bundles comprises y consecutive RBs numbered first in a time domain and then in a frequency domain, wherein y is the configured RB bundle size.

Example 8 comprises the subject matter of any variation of any of example(s) 5-7, wherein the set of time and frequency resources comprises one or more OFDM (Orthogonal Frequency Division Multiplexing) symbols, and wherein each RB bundle of the plurality of RB bundles comprises y consecutive RBs, wherein whether the y consecutive RBs are numbered first in a frequency domain and then in a time domain or numbered first in the time domain and then in the frequency domain is configured via RRC (Radio Resource Control) signaling.

Example 9 comprises the subject matter of any variation of any of example(s) 5-8, wherein the processing circuitry is configured to: perform coherent combining within RB bundles of the plurality of RB bundles; and perform non-coherent combining between RB bundles of the plurality of RB bundles.

Example 10 comprises the subject matter of any variation of any of example(s) 5-9, wherein the set of time and frequency resources comprises a plurality of OFDM (Orthogonal Frequency Division Multiplexing) symbols, and wherein each RB bundle of the plurality of RB bundles is associated with a different OFDM symbol of the plurality of OFDM symbols.

Example 11 comprises the subject matter of any variation of any of example(s) 5-9, wherein the set of time and frequency resources comprises one or more OFDM (Orthogonal Frequency Division Multiplexing) symbols, and wherein each OFDM symbol of the one or more OFDM symbols comprises two or more RB bundles of the plurality of RB bundles.

Example 12 comprises the subject matter of any variation of any of example(s) 1-4, wherein the set of RBs comprises x RB bundles independent of a target coverage level, wherein x is equal to a transmit diversity order configured via RRC (Radio Resource Control) signaling.

Example 13 comprises the subject matter of any variation of any of example(s) 12, wherein each RB bundle of the plurality of RB bundles comprises y consecutive RBs numbered first in a frequency domain and then in a time domain.

Example 14 comprises the subject matter of any variation of any of example(s) 12, wherein each RB bundle of the plurality of RB bundles comprises y consecutive RBs numbered first in a time domain and then in a frequency domain.

Example 15 comprises the subject matter of any variation of any of example(s) 12-14, wherein the power saving signal is a power saving signal candidate of a plurality of power saving signal candidates configured to the UE, wherein each power saving signal candidate of the plurality of power saving signal candidates comprises x RB bundles.

Example 16 comprises the subject matter of any variation of any of example(s) 15, wherein the plurality of power saving signal candidates comprises a first power saving signal candidate with a first coverage level and a first RB bundle size, and wherein the plurality of power saving signal candidates further comprises a second power saving signal candidate with a different second coverage level and a different second RB bundle size.

Example 17 is an apparatus configured to be employed in a gNB (next generation Node B), comprising: a memory interface; and processing circuitry configured to: generate, for a UE (User Equipment) in a power saving mode, a power saving signal for a drx-onDuration (Discontinuous Reception On Duration) occasion, wherein the power saving signal is a WUS (Wake Up Signal) or a GTS (Go To Sleep signal); and map the power saving signal associated with to a set of RBs (Resource Blocks) comprising a first plurality of RBs associated with a first precoder and a different second set of RBs associated with a different second precoder, wherein the set of RBs are within a configured set of time and frequency resources of the power saving signal.

Example 18 comprises the subject matter of any variation of any of example(s) 17, wherein the processing circuitry is further configured to generate RRC (Radio Resource Control) signaling that configures one of a RB bundle size of the power saving signal or a transmit diversity order of the power saving signal.

Example 19 is a machine readable medium comprising instructions that, when executed, cause a User Equipment (UE) to: process a power saving signal associated with a drx-onDuration (Discontinuous Reception On Duration) occasion, wherein the power saving signal is received via a set of RBs (Resource Blocks) comprising a first plurality of RBs associated with a first precoder and a different second set of RBs associated with a different second precoder, wherein the set of RBs are within a configured set of time and frequency resources of the power saving signal; and determine, based on at least one of the set of RBs, a signal waveform of the power saving signal, or signaling content of the power saving signal, whether the power saving signal is a WUS (Wake Up Signal) or a GTS (Go To Sleep signal).

Example 20 comprises the subject matter of any variation of any of example(s) 19, wherein the instructions, when executed, further cause the UE to process RRC (Radio Resource Control) signaling that configures one of a RB bundle size of the power saving signal or a transmit diversity order of the power saving signal.

Example 21 comprises an apparatus comprising means for executing any of the described operations of examples 1-20.

Example 22 comprises a machine readable medium that stores instructions for execution by a processor to perform any of the described operations of examples 1-20.

Example 23 comprises an apparatus comprising: a memory interface; and processing circuitry configured to: perform any of the described operations of examples 1-20.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature can be combined with one or more other features of the other implementations as may be desired and advantageous for any given or particular application.

What is claimed is:

1. An apparatus configured to be employed in a UE (User Equipment), comprising:
a memory interface; and
processing circuitry configured to:
process a power saving signal associated with a drx-onDuration (Discontinuous Reception On Duration) occasion of a Connected mode DRX, wherein the power saving signal is received via a set of RBs (Resource Blocks) comprising a first plurality of RBs associated with a first precoder and a second plurality of RBs associated with a second precoder, wherein both the first plurality of RBs and the second plurality of RBs are within a configured set of time and frequency resources of the power saving signal; and
determine, based on the first plurality of RBs or the second plurality of RBs, a signal waveform of the power saving signal, or signaling content of the power saving signal, whether the power saving signal is a WUS (Wake Up Signal) or a GTS (Go To Sleep signal).

2. The apparatus of claim 1, wherein the power saving signal is the WUS, and wherein the processing circuitry is further configured to:
cause the UE to enter a NAM (Network Access Mode), wherein a MAC (Media Access Control) entity of the UE is switched to "Active Time" during a drx-onDuration period following the drx-onDuration occasion; and
perform monitoring of a PDCCH (Physical Downlink Control Channel) during the drx-onDuration period.

3. The apparatus of claim 1, wherein the power saving signal is the GTS, and wherein the processing circuitry is further configured to:
cause the UE to remain in a power saving mode, wherein a MAC (Media Access Control) entity of the UE remains in "Non-Active Time" during a drx-onDuration period following the drx-onDuration occasion, wherein the UE does not perform monitoring of a PDCCH (Physical Downlink Control Channel) during the drx-onDuration period.

4. The apparatus of claim 1, wherein the power saving signal is a power saving signal candidate of a plurality of power saving signal candidates configured to the UE, wherein the processing circuitry being configured to process the power saving signal comprises the processing circuitry being configured to attempt detection of whether one or more power saving signal candidates of the plurality of power saving signal candidates were received during the drx-onDuration occasion.

5. The apparatus of claim 1, wherein the set of RBs comprises a plurality of RB bundles, wherein each RB bundle of the plurality of RB bundles has a configured RB bundle size, wherein the first plurality of RBs is a first RB bundle of the plurality of RB bundles, and wherein the second plurality of RBs is a second RB bundle of the plurality of RB bundles.

6. The apparatus of claim 5, wherein the set of time and frequency resources comprises one or more OFDM (Orthogonal Frequency Division Multiplexing) symbols, and wherein each RB bundle of the plurality of RB bundles comprises y consecutive RBs numbered first in a frequency domain and then in a time domain, wherein y is the configured RB bundle size.

7. The apparatus of claim 5, wherein the set of time and frequency resources comprises one or more OFDM (Orthogonal Frequency Division Multiplexing) symbols, and wherein each RB bundle of the plurality of RB bundles comprises y consecutive RBs numbered first in a time domain and then in a frequency domain, wherein y is the configured RB bundle size.

8. The apparatus of claim 5, wherein the set of time and frequency resources comprises one or more OFDM (Orthogonal Frequency Division Multiplexing) symbols, and wherein each RB bundle of the plurality of RB bundles comprises y consecutive RBs, wherein whether the y consecutive RBs are numbered first in a frequency domain and then in a time domain or numbered first in the time domain and then in the frequency domain is configured via RRC (Radio Resource Control) signaling.

9. The apparatus of claim 5, wherein the processing circuitry is configured to:
perform coherent combining within RB bundles of the plurality of RB bundles; and
perform non-coherent combining between RB bundles of the plurality of RB bundles.

10. The apparatus of claim 5, wherein the set of time and frequency resources comprises a plurality of OFDM (Orthogonal Frequency Division Multiplexing) symbols, and wherein each RB bundle of the plurality of RB bundles is associated with a different OFDM symbol of the plurality of OFDM symbols.

11. The apparatus of claim 5, wherein the set of time and frequency resources comprises one or more OFDM (Orthogonal Frequency Division Multiplexing) symbols, and wherein each OFDM symbol of the one or more OFDM symbols comprises two or more RB bundles of the plurality of RB bundles.

12. The apparatus of claim 1, wherein the set of RBs comprises x RB bundles independent of a target coverage level, wherein x is equal to a transmit diversity order configured via RRC (Radio Resource Control) signaling.

13. The apparatus of claim 12, wherein each RB bundle of the x RB bundles comprises y consecutive RBs numbered first in a frequency domain and then in a time domain.

14. The apparatus of claim 12, wherein each RB bundle of the x RB bundles comprises y consecutive RBs numbered first in a time domain and then in a frequency domain.

15. The apparatus of claim 12, wherein the power saving signal is a power saving signal candidate of a plurality of power saving signal candidates configured to the UE, wherein each power saving signal candidate of the plurality of power saving signal candidates comprises x RB bundles.

16. The apparatus of claim 15, wherein the plurality of power saving signal candidates comprises a first power saving signal candidate with a first coverage level and a first RB bundle size, and wherein the plurality of power saving signal candidates further comprises a second power saving signal candidate with a different second coverage level and a different second RB bundle size.

17. An apparatus configured to be employed in a gNB (next generation Node B), comprising:
a memory interface; and
processing circuitry configured to:
generate, for a UE (User Equipment) in a power saving mode, a power saving signal for a drx-onDuration (Discontinuous Reception On Duration) occasion of a Connected mode DRX, wherein the power saving signal is a WUS (Wake Up Signal); and
map the power saving signal to a set of RBs (Resource Blocks) comprising a first plurality of RBs associated with a first precoder and a different second plurality of RBs associated with a second precoder, wherein both the first plurality of RBs and the second plurality of RBs are within a configured set of time and frequency resources of the power saving signal.

18. The apparatus of claim 17, wherein the processing circuitry is further configured to generate RRC (Radio Resource Control) signaling that configures a RB bundle size, wherein the first plurality of RBs is a first RB bundle of the RB bundle size, and the second plurality of RBs is a second RB bundle of the RB bundle size.

19. A non-transitory machine readable medium comprising instructions that, when executed, cause a User Equipment (UE) to:
process a power saving signal associated with a drx-onDuration (Discontinuous Reception On Duration) occasion of a Connected mode DRX, wherein the power saving signal is received via a set of RBs (Resource Blocks) comprising a first plurality of RBs associated with a first precoder and a different second plurality of RBs associated with a second precoder, wherein both the first plurality of RBs and the second plurality of RBs are within a configured set of time and frequency resources of the power saving signal; and
determine, based on the first plurality of RBs or the second plurality of RBs, a signal waveform of the power saving signal, or signaling content of the power saving signal, whether the power saving signal is a WUS (Wake Up Signal) or a GTS (Go To Sleep signal).

20. The non-transitory machine readable medium of claim 19, wherein the instructions, when executed, further cause the UE to process RRC (Radio Resource Control) signaling that configures one of a RB bundle size, wherein the first plurality of RBs is a first RB bundle of the RB bundle size, and the second plurality of RBs is a second RB bundle of the RB bundle size.

* * * * *